United States Patent [19]

Lee, Sr.

[11] Patent Number: 5,542,981
[45] Date of Patent: Aug. 6, 1996

[54] PROCESS FOR REMOVING MINERAL DEPOSITS FROM LAGOON RECYCLE LINES

[76] Inventor: Clel E. Lee, Sr., 1182 Farm Quarter Rd., Mt. Pleasant, S.C. 29465

[21] Appl. No.: 263,532

[22] Filed: Jun. 22, 1994

[51] Int. Cl.$^6$ .................. C23G 1/02; B08B 3/08
[52] U.S. Cl. ............... 134/3; 134/22.14; 134/22.19; 134/28; 134/41
[58] Field of Search .............. 134/22.14, 22.19, 134/3, 28, 41; 252/87, 85

[56] References Cited

U.S. PATENT DOCUMENTS

| | | | |
|---|---|---|---|
| 2,631,950 | 3/1953 | Rosenfeld | 134/3 |
| 2,678,290 | 5/1954 | Noble | 134/3 |
| 2,995,477 | 8/1961 | Florence | 134/22.19 |
| 3,003,899 | 10/1961 | Eberhard | 134/22.14 |
| 3,072,502 | 1/1963 | Alfano | 134/22.19 |
| 3,260,619 | 7/1966 | Shoemaker | 134/3 |
| 3,953,352 | 4/1976 | Mizutzni | 252/142 |
| 4,619,710 | 10/1986 | Kuenn et al. | 134/22.17 |
| 4,678,597 | 7/1987 | Kiener | 252/100 |
| 4,802,990 | 2/1989 | Inskeep, Jr. | 210/699 |
| 4,913,823 | 4/1990 | Lipinski et al. | 210/699 |
| 5,021,096 | 6/1991 | Abadi | 134/22.14 |
| 5,062,387 | 11/1991 | Anderson | 119/28 |
| 5,174,906 | 12/1992 | Henry | 210/765 |

*Primary Examiner*—Jan H. Silbaugh
*Assistant Examiner*—Saeed Chaudhry
*Attorney, Agent, or Firm*—Hardaway Law Firm PA

[57] ABSTRACT

A process of using organic acids to remove mineral scale from waste lagoon recycle and irrigation lines is provided. An effective amount of a water soluble carboxylic acid is used in a multi-step process to clean recycle lines, associated irrigation pumps, and finishing floor of a live-stock housing facility. The cleaning mixture has further advantages upon being released into a waste lagoon of helping to maintain the waste lagoon in an aerobic condition.

1 Claim, No Drawings

5,542,981

PROCESS FOR REMOVING MINERAL DEPOSITS FROM LAGOON RECYCLE LINES

BACKGROUND OF THE INVENTION

This invention is directed towards commercial swine operations and more particularly to a process and formula for cleaning clogged recycle lines. Current industrial practice in the swine industry requires that the finishing floors, i.e., the enclosed pens where swine are housed for rapid weight gain, require periodic flushing three or four times a day. U.S. Pat. No. 5,062,387 issued to Anderson on Nov. 5, 1991, provides an example of an animal waste flushing apparatus and method and this publication is incorporated by reference herein in its entirety. Typically, the flushing uses water from a lagoon pit or waste pond which is piped to the finishing floor. The run-off from the flushing is in turn discharged into the waste lagoon.

While solid waste materials tend to settle to the bottom of the lagoon pit, high levels of water soluble minerals and organic matter quickly build up in the lagoon. As this build-up accumulates, drain lines, recirculating lines and associated pumps rapidly accumulate scale and other mineral build-up which has proven difficult to remove.

Heretofore, people have used extremely caustic materials such as muriatic acid to clean and maintain the lines. Caustic acids are hazardous to workers, have slow reaction times, and are damaging to the pumps as well as the pipes. Mechanical routering of the pipes is also unsatisfactory since the abrasion shortens the useable life of the pipes. Therefore, there remains much room for improvement within the art.

SUMMARY OF THE INVENTION

It is an object of this invention to provide an organic acid line cleaner which can remove line deposits associated with recirculating lagoon lines.

It is a further object of this invention to provide a polycarboxylic acid based line cleaner which is safe to use with minimal precautions.

It is still a further and more particular object of this invention to provide a water soluble, line cleaner which can be supplied as a dry solid concentrate.

It is still a further and more particular object of this invention to provide a line cleaner which is safe and effective for use with a metal pumping apparatus.

It is still a further and more particular object of this invention to provide a line cleaner which utilizes polycarboxylic acids to dissolve mineral and scale deposits.

It is still a further and more particular object of this invention to provide a formula for a line cleaner which is biodegradable.

In accordance with this invention, these as well as other objects are provide by a line cleaner and descaler composition comprising: a water soluble organic acid such as polycarboxylic acids and their corresponding water soluble salts selected from the group of acrylic acid, oxalic acid, malonic acid, succinic acid, malic acid, citric acid, 1,2-cyclohexanedicarboxylic acid, 1,3-diclohexanedicarboxylic acid, 1,4-cyclohexanedicarboxlic acid, 1,1-cyclohexanedicarboxylic acid, 1,2-cyclopentanedicarboxylic acid and polyacrylic acid;

a dispersing agent selected from the group of sodium chloride, aluminum sulfate, and sodium sulfate;

sulfamic acid;

a wetting agent selected from the group of sodium salt of sulfonated oleic acid and polyethylene glycol; and a water soluble dye.

DETAILED DESCRIPTION

Common livestock production techniques often use manure or waste lagoons for disposing and treatment of manure and urine which is associated with livestock production. Waste lagoons, particularly those involved in swine production, are often used as a water source for periodic flushing of the pens and finishing facilities where the swine are housed.

The periodic flushing removes liquid and solid wastes from the finishing floor, the waste material then being drained back into the waste lagoon. Lagoon treatment of waste is needed to permit either aerobic or anaerobic breakdown of the waste prior to further disposal. For several reasons, it is desirable to reuse or recycle the lagoon water in the flushing operations. Recycling minimizes the initial amount of water needed which must be used. Secondly, recycling minimizes the volume of lagoon water which needs to be stored. Likewise, the ultimate disposal of the lagoon waste is facilitated by limiting the volume of lagoon liquid which must be disposed of.

Current industry practice utilizes PVC pipe to run recycle lines between waste lagoons and the flush tanks of a swine finishing facility. A typical set up involves placing submerged pumps in the lagoon to withdraw lagoon water which is then pumped through a plurality of PVC lines to the flush tanks located on the finishing floors. The flush tanks are used to periodically flood the finishing floor with a large release of the recycled water. Drain lines then collect and feed the recycled water and accumulated waste to the lagoon where the process is then repeated.

The present invention is directed towards solving the problem of clogging by the recycle lines. The recycle liquid is high in mineral content and mineral scale and deposits from salt, calcium, lime, magnesium, and other inorganic materials which will rapidly accumulate within the lines. Essentially, the lines become completely occluded by the build-up. Further, the buildup will accumulate on the submerged pumps, greatly shortening the pump's useful life.

Traditional methods of removing the mineral build-up have proven unsatisfactory. A hammer and chisel is often used to remove accessible deposits from regions of pumps and the terminal portions of the recycle lines. Routering is ineffective since commonly used PVC pipe, is easily damaged by the routering process. Traditional chemical line cleaners have relied upon a muriatic acid to dissolve the deposits. However, muriatic acid is extremely hazardous, unsafe for use with livestock, not biodegradable, and is corrosive to metal pumps.

In accordance with this invention it has been found that organic acids such as aliphatic polycarboxylic acids can be employed as an active component of a line cleaner. The line cleaner is particularly useful in that the ingredients are biodegradable, can be supplied in a bulk dry powdered form for easier handling and transport, have a low toxicity and hazard rating, can be used with a minimum of training and safety equipment, and can be safely used with the livestock being present, thereby not disrupting the livestock production schedule.

A preferred formula of the line cleaner concentrate is depicted below in reference to table 1. The percentage references are on a per weight basis of the solid reagents of the following chemicals and compounds.

TABLE 1

| NAME OF ACID | PERCENTAGE OF CONCENTRATE BY DRY WEIGHT |
| --- | --- |
| Oxalic Acid | 50% |
| Sodium Chloride | 25% |
| Sulfamic Acid | 5% |
| Sodium Salt of Sulfonated Olaic Acid | 15% |
| Pyrazol Red 7BSW Powder | 5% |

The above ingredients are supplied in a premixed powdered/crystal form. The use of the preferred formulation is best described in reference to the following example:

EXAMPLE 1

The formula of table 1 is dissolved at a rate of approximately fifty pounds of the concentrate per approximately one hundred gallons of water. Recycle water is readily compatible with the formula and it is anticipated that it will be used.

The dissolved formula solution, hereinafter "cleaner", is introduced into the recycle lines by submerging the lagoon pump into a container of the cleaner and operating the pump until the cleaner has travelled through the length of the recycle lines. The powdersol red dye helps in monitoring the cleaner circulation through the recycle lines.

Once the cleaner has reached all points of the line, the various line outlets are closed and the pump and lines are left to soak in contact with the cleaner for twenty four to forty eight hours. Following the treatment above, the recycle lines are then drained of the cleaner solution now containing the dissolved mineral and scale products.

When used as above, the initial pH of the formula is approximately 1.5. As the cleaner is introduced into the lines, it is thought that the pH value rapidly increases as the cleaner migrates through the recycle lines. However, it has been found that when used as instructed, even the remote ends of the recycle lines of severely clogged lines will have the scale and mineral deposits removed. The cleaner is also highly effective in removing the deposits from the pump and the cleaner has been found safe to use for both plastic PVC pipes as well as the metal pumps.

Following treatment of the pump and recycle lines, the cleaner solution can be safely introduced into the lagoon where the carboxylic acids will degrade in the lagoon waste treatment process. In certain situations, the cleaner can be recirculated in a continuous or periodic pumping action through the lines which should speed up the clearing process. Likewise, draining the cleaner and reintroducing the same cleaner solution should increase the rate of unclogging by increasing the overall strength of the cleaner, particularly at the distant ends of the recycle lines.

It has also been found that the dissolved formula can be stored and reused to a limited extent if collected in nonmetal containers. However, since the carboxylic acid fraction of the formula will degrade, the useful life of the used cleaner is uncertain and depends upon many variables such as the stored solution's pH, storage temperature and conditions, and the level of cleaner exhaustion attributable to the unclogging of the previous lines. When reused, partial replenishment by the addition of fresh powdered formula may be desirable.

The reuse of the cleaner is not recommended for additional reasons as well. One, the used cleaner solution has been found to have a beneficial affect on the lagoon treatment system. While waste lagoons can be operated either aerobically {approximately neutral pH} or anaerobically {pH 8.2 or above}, most commercial swine production facilities favor an aerobic waste lagoon system. Aerobic lagoons operate most effectively at a pH between 6.9 to 7.2 but tend to become basic as large amounts of animal wastes are introduced. Therefore, it has been found that the addition of the used cleaner to the lagoon system helps to restore and maintain the moderate pH values which are desired for an aerobic waste lagoon.

An additional advantage of the cleaner is that the cleaner can be safely used while the swine are on the finishing floor. Therefor, once the cleaner has been used to dissolve the scale and mineral build-up on the pipes, the flush tanks can be filled with the used cleaner from the recycle lines. This subsequent flushing of the finishing floors with the cleaner solution removes scale and mineral deposits from the finishing floor as well. As a result, the floor surface is cleaned and makes subsequent water flushing more efficient at removing accumulated animal waste.

Use of the cleaner on the finishing floor has been found so effective, that the first time a finishing floor is treated, the amount of scale, minerals, and solid wastes which are loosened from the finishing floor are such that the drainage lines and system will often become clogged. Such a dramatic response is merely indicative of the effectiveness of the cleaner. To avoid such extremes, it is desirable to periodicly use the cleaner in the recycle lines and the finishing floors to prevent massive buildup from accumulating.

The formula set forth in table 1 is preferred for the PVC pipes which are commonly used in the swine industry for recirculation lines and lagoon irrigation lines. The formula set forth in table 1 has been found safe for prolonged exposure to PVC pipes as well as metal pumps. The formula is much safer to handle than prior art inorganic acids, such as muriatic acid, and is safe to use in diluted form with livestock present. Further, the organic acids and acid salts will break down and decompose once diluted for use and are biodegradable in the waste lagoon environment where they help restore a desired lagoon pH balance.

The preferred formula uses oxalic acid crystals at fifty percent of the concentrate by dry weight. However, it is believed that the effective amount of the carboxylic acids, such as oxalic acid, can vary from 30–70% by dry weight as given in reference to the preferred concentrate formula. Oxalic acid is preferred in that it is readily soluble in water, is cost effective, and appears to work more effectively than other comparable cost carboxylic acids.

While an aqueous solution of oxalic acid, other listed carboxylic acids, and corresponding soluble salts, have some line cleaning ability in and of themselves, additional reagents have been found to increase the effectiveness and/or facilitate the use of the line cleaner.

For instance, the use of sodium chloride as a filler and dispersant was surprisingly found to facilitate the cleaning ability of the line cleaner. Where sodium chloride has been left out of the formula, the resulting solution was less efficient at opening clogged lines. The exact function sodium chloride exerts is unknown. However, it may be possible that other compounds which supply sodium and chloride ions from other sources could give comparable results. The preferred formula also has sulfamic acid present as a pH stabilizer. The sulfamic acid helps lower the overall pH and to maintain the desired pH under the treatment conditions. However, sulfamic acid can be omitted from the cleaner formula.

The sodium salt of sulfonated oleic acid is added as a wetting agent which improves the flow properties of the cleaner through the obstructed and clogged recycle lines. However, other well known wetting agents such as polyethylene glycol could suffice but oleic acid is preferred in that it has a low toxicity and will break down under lagoon treatment conditions.

The powdersol red 7BSW powder is a dye added to the formula to assist the operator in tracing and monitoring cleaner movement through the recycled lines. The dye also alerts users handling the dry powder to spillage or contamination problems and helps to identify spillage or loss of the concentrated formula. However, many varieties of a dye or color indicator could be used.

The cleaner is also useful for reopening PVC lines associated with lagoon irrigation systems. Periodically, lagoon treated waste water is sprayed on fields as a final step in the treatment and removal of the lagoon waste. Therefore, pumps and lines associated with the irrigation system will clog with scale and mineral deposits similar to the recycle lines. The present invention can be successfully used to treat the irrigation lines similar to the process described for the recycle lines.

While Table 1 above sets forth the preferred formulation of the dry concentrate, a useful formulation range includes 30–70% by dry weight of oxalic acid or other water soluble carboxylic acid; 15–35% by dry weight of sodium chloride; 0–10% by dry weight sulfamic acid; and 0–25% by dry weight of a sodium salt of sulfonated oleic acid. It is believed that a 30–70% by dry weight of a water soluble carboxylic acid selected from the group consisting of acrylic acid, oxalic acid, malonic acid, succinic acid, malic acid, citric acid, 1,2-cyclohexanedicarboxylic acid, 1,3-diclohexanedicarboxylic acid, 1,4-cyclohexanedicarboxlic acid, 1,1-cyclohexanedicarboxylic acid, 1,2-cyclopentanedicarboxylic acid and polyacrylic acid provided in a mixture set forth above provides an effective amount of a waste lagoon re-cycle line cleaner.

Irrigation lines can be treated by submerging the pump in a container filled with the cleaner solution. The pump is operated until the cleaner has run the length of the irrigation lines at which times the spraying heads or outlets are sequentially capped off and the cleaner solution is allowed to sit for twenty four to forty eight hours. If needed, the sprayer heads of the irrigation systems can be removed and soaked in the cleaner which removes scale build-up. As described with the recycle lines, the pump associated with the irrigation system can also be placed in the cleaner to remove mineral deposits and scale. Once the cleaner solution has removed the deposits, the irrigation lines are drained directly into the lagoon or collected for reuse.

The formula and diluted cleaner described above represents an important improvement in the art of scale and mineral deposit removal from waste lagoon recycle and irrigation lines. The line build-up which accumulates in recycle lines is a hardened solid mass which can be only forcibly removed with a hammer or chisel. A similar build-up also occurs on pumps and greatly shortens the life expectancy of the pumps. In addition, the line build-up increases the cost of operating the recycle and irrigation lines by requiring the pumps to run longer to pump the same volume of water through the restricted and clogged lines.

The above example and descriptions are provided for clearing recycle lines which are severely occluded. Routine use and maintenance can prevent the mineral and scale buildup from reaching high levels. With routine use, the length of treatment as well as the amount of concentrate required could be reduced.

The advantages of the instant invention offer a distinct improvement over the prior art methods and chemical treatments used to clean clogged lines. The organic acids used are much safer to use and handle. The risk of injury to workers is much reduced when compared to the hazards associated with muriatic acid to dissolve mineral deposits. In addition, the cleaner of the instant invention is much safer for release into the environment and the constituents will readily break down in the lagoon environment. The cleaner solution is also safe for prolonged exposure to conventional pumps. Further, the cleaner solution is safe to use with livestock present and has the additional advantages of cleaning the finishing floor and pens of the livestock facility. Other improvements over prior art mineral and scale cleaners include the fact that the instant invention is directed towards a one step process and formula. Effective cleaning is achieved merely by exposing the mineral build-up to the cleaner and then draining the cleaning and dissolved mineral and scale. No additional purging of the lines or subsequent chemical treatment is needed. Further, the cleaner solution and process does not rely upon expensive chelators or neutralization steps. Further, no buffers are added or required since the cleaner is effective over a broad pH range.

As many variations and modifications of the above process and formula will be apparent to those having skill in the art from a reading of the above specification, and, therefore, such variations are within the spirit and the scope of the following appended claims.

That which is claimed:

1. A process of cleaning mineral deposits from a livestock production facility using lagoon recycle lines comprising the following steps:

supplying a line cleaner concentrate comprising 30–70% by dry weight of oxalic acid; 15–35% by dry weight of sodium chloride; 0–10% by dry weight sulfamic acid; and, 0–25% by dry weight of a sodium salt of sulfonated oleic acid;

dissolving said concentrate in water, thereby forming a cleaning mixture;

introducing said cleaning mixture into a recycle line;

soaking a pump in communication with said recycle lines in said cleaning mixture;

soaking said recycle lines and said pumps until the mineral deposits are dissolved;

draining said recycle lines of said cleaning mixture and said dissolved mineral deposits into a flush tank;

discharging said cleaning mixture and said dissolved mineral deposits from said flush tank to a finishing floor;

dissolving additional mineral deposits associated with said finishing floor by contact with said discharged cleaning mixture;

draining said cleaning mixture from said finishing floor; and, flushing said finishing floor with additional water.

* * * * *